(12) United States Patent
Tov et al.

(10) Patent No.: US 11,799,983 B2
(45) Date of Patent: Oct. 24, 2023

(54) RANKING INTERNET OF THINGS (IOT) DATA BASED ON IOT ANALYTICS SERVICES

(71) Applicant: MOTOROLA SOLUTIONS, INC., Chicago, IL (US)

(72) Inventors: Jacob Shem Tov, Jerusalem (IL); Oren Zakaria, Raanana (IL); Haim Kahlon, Shoam (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/455,702

(22) Filed: Nov. 19, 2021

(65) Prior Publication Data

US 2023/0164236 A1    May 25, 2023

(51) Int. Cl.
| | |
|---|---|
| G06F 15/16 | (2006.01) |
| H04L 67/564 | (2022.01) |
| H04L 43/04 | (2022.01) |
| G16Y 40/20 | (2020.01) |
| H04L 67/12 | (2022.01) |

(52) U.S. Cl.
CPC .......... *H04L 67/564* (2022.05); *G16Y 40/20* (2020.01); *H04L 43/04* (2013.01); *H04L 67/12* (2013.01)

(58) Field of Classification Search
CPC ....... H04L 67/564; H04L 43/04; H04L 67/12; G16Y 40/20
See application file for complete search history.

(56) References Cited

U.S. PATENT DOCUMENTS

| | | | |
|---|---|---|---|
| 10,810,806 B2 | 10/2020 | Petousis et al. | |
| 2015/0019342 A1* | 1/2015 | Gupta | G06Q 30/0269 705/14.66 |
| 2017/0262923 A1* | 9/2017 | Bute | H04W 4/23 |
| 2021/0049183 A1 | 2/2021 | Ramanathan et al. | |

FOREIGN PATENT DOCUMENTS

CN           1984423 A           6/2007

* cited by examiner

*Primary Examiner* — Normin Abedin
(74) *Attorney, Agent, or Firm* — Raguraman Kumaresan

(57) ABSTRACT

A process of ranking internet-of-things (IoT) data based on IoT analytics services. In operation, the IoT gateway receives IoT data captured by an IoT device and transmits the IoT data to IoT analytics servers each providing a different IoT analytics service. The IoT gateway receives acknowledgments including data rankings from IoT analytics servers. Each of the acknowledgments include a respective one of the data rankings indicating an importance of the IoT data as an input to the IoT analytics service provided by a respective one of the IoT analytics servers. The IoT gateway assigns an aggregated data ranking to the IoT data based on the data rankings included in the acknowledgments received from the IoT analytics servers. The IoT gateway then transmits, to the IoT device, an electronic notification including the aggregated data ranking assigned to the IoT data.

21 Claims, 8 Drawing Sheets

| IoT DATA IDENTIFIER 310 | TIME 320 | WATER LEVEL MEASUREMENT 330 | PRESSURE MEASUREMENT 340 | PUMP ENGINE SPEED MEASUREMENT 350 | METADATA (WEATHER) 360 |
|---|---|---|---|---|---|
| D1 | T1 | 5 | 42 | 36 | SUNNY |
| D2 | T2 | 30 | 42 | 36 | RAINY |
| D3 | T3 | 25 | 42 | 36 | SUNNY |
| D3 | T4 | 25 | 42 | 36 | SUNNY |
| D2 | T5 | 30 | 42 | 36 | RAINY |
| D1 | T6 | 5 | 42 | 36 | SUNNY |
| D3 | T7 | 25 | 42 | 36 | SUNNY |
| D2 | T8 | 30 | 42 | 36 | RAINY |

IoT DATA INFORMATION 230

FIG. 3

IoT DATA TRANSMISSION STATUS INFORMATION (PREDEFINED THRESHOLD : 50) — 235

| IoT DATA IDENTIFIER | TIME | WATER LEVEL MEASUREMENT | STORED DATA RANKING | BROADBAND STATUS CONNECTION | TRANSMISSION STATUS | DATA RANKING ASSIGNED AFTER TRANSMISSION |
|---|---|---|---|---|---|---|
| D1 | T1 | 5 | - | WORKING | TRANSMITTED (VIA BROADBAND) | NEW VECTOR (30) |
| D2 | T2 | 30 | - | WORKING | TRANSMITTED (VIA BROADBAND) | NEW VECTOR (55) |
| D3 | T3 | 25 | - | WORKING | TRANSMITTED (VIA BROADBAND) | NEW VECTOR (35) |
| D3 | T4 | 25 | 35 | WORKING | NOT TRANSMITTED (NO CHANGE-OF-STATE) | NO CHANGE IN RANKING |
| D2 | T5 | 30 | 55 | FAILURE | TRANSMITTED (VIA NARROWBAND AS 55>50) | NO CHANGE IN RANKING |
| D1 | T6 | 5 | 30 | WORKING | TRANSMITTED (VIA BROADBAND) | NO CHANGE IN RANKING |
| D3 | T7 | 25 | 35 | FAILURE | NOT TRANSMITTED (AS 35<50) | NO CHANGE IN RANKING |
| D2 | T8 | 30 | 55 | FAILURE | TRANSMITTED (VIA NARROWBAND AS 55>50) | NO CHANGE IN RANKING |

*FIG. 4*

IoT DATA RANKING INFORMATION — 530

| IoT DATA — 610 | ANALYTICS SERVICE 1 (WATER DISTRIBUTION OPTIMIZATION) — 620 | ANALYTICS SERVICE 2 (PUMP MAINTENANCE) — 630 | ANALYTICS SERVICE 3 (WATER USAGE INSIGHTS) — 640 | AGGREGATED DATA PRIORITY VALUE — 650 |
|---|---|---|---|---|
| WATER LEVEL CHANGE TO 5; (SUNNY WEATHER) | 40 | 15 | 35 | 30 |
| WATER LEVEL CHANGE 30; (RAINY WEATHER) | 100 | 15 | 50 | 55 |
| WATER LEVEL CHANGE TO 25 (SUNNY WEATHER) | 50 | 15 | 40 | 35 |

RANKING INTERNET OF THINGS (IOT) DATA BASED ON IOT ANALYTICS SERVICES

BACKGROUND

Internet-of-Things (IoT) platform allows objects embedded with sensors and network connectivity to communicate with each other and to the internet. With the advent of low-cost, low-power sensor technology, it has become economically feasible for manufacturers to adapt physical objects of all shapes and sizes to collect and report data about the way the objects are used as well as about the environment around the objects. The IoT platform provides analytics services using the data generated by connected physical objects. As an example, utility companies such as water management companies use the IoT platform to gain insights on water distribution, consumption, capacity, equipment failure, leakage, contamination etc.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 3 shows an example of IoT data information maintained by an IoT device in accordance with some embodiments.

FIG. 4 shows an example of IoT data transmission status information maintained by an IoT device in accordance with some embodiments.

FIG. 6 shows an example of IoT data ranking information maintained by an IoT gateway in accordance with some embodiments.

Figure 1:
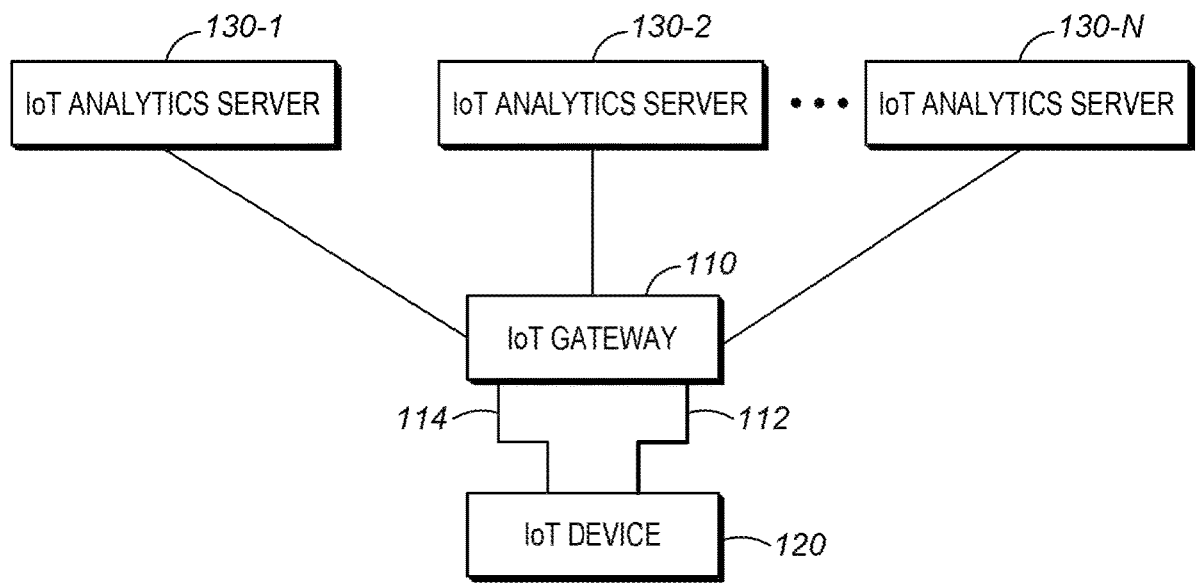
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

IoT analytics services enable companies to leverage data generated by IoT devices to gain insights about their operations. This requires IoT devices to capture and report IoT data for consumption by different IoT analytics services. While broadband technologies allow companies to collect and process high bandwidth data collection applications, some companies may still want to use their low bandwidth narrowband communication link (e.g., a land mobile radio (LMR) link) as a redundant link to the high bandwidth broadband communication link for collecting data captured by the IoT devices. In case of a failure in the broadband communication link, the IoT devices may be configured to report IoT data via the narrowband communication link. However, the narrowband communication link may not provide enough bandwidth to transmit all of the IoT data captured by the IoT devices. In addition, the importance of any given IoT data may differ for different analytics services. As an example, an analytics service supporting water management and distribution may weigh water level change during a rainy condition as a critical factor for providing analytics insights needed for optimizing water distribution. However, an analytics service providing insights for pump maintenance may not weigh water level change or weather transition as a critical factor for predicting pump maintenance. Therefore, there is a need for prioritizing transmission of certain IoT data via the narrowband communication link during failure of broadband connection based on the criticality of the IoT data to different analytics servers for providing their respective analytics services. Accordingly, what is disclosed is an improved system and process for ranking IoT data based on IoT analytics services.

One embodiment provides a method of ranking internet-of-things (IoT) data based on IoT analytics services. The method comprises: receiving, at an IoT gateway, IoT data captured by an IoT device, transmitting, at the IoT gateway, the IoT data to a plurality of IoT analytics servers each providing a different IoT analytics service; receiving, at the IoT gateway, acknowledgments including data rankings from the plurality of IoT analytics servers, each of the acknowledgments including a respective one of the data rankings indicating an importance of the IoT data as an input to the IoT analytics service provided by a respective one of the IoT analytics servers; assigning, at the IoT gateway, an aggregated data ranking to the IoT data based on the data rankings included in the acknowledgments received from the IoT analytics servers; and transmitting, at the IoT gateway, to the IoT device, an electronic notification including the aggregated data ranking assigned to the IoT data.

Another embodiment provides A method of ranking internet-of-things (IoT) data based on IoT analytics services. The method comprises: transmitting, at an IoT device, IoT data captured by the IoT device to a plurality of IoT analytics servers each providing a different IoT analytics service; receiving, at the IoT device, acknowledgments including data rankings from the plurality of IoT analytics servers, each of the acknowledgments including a respective one of the data rankings indicating an importance of the IoT data as an input to the IoT analytics service provided by a respective one of the IoT analytics servers; assigning, at the IoT device, an aggregated data ranking for the IoT data based on the data rankings including in the acknowledgments received from the IoT analytics servers; and storing, at the IoT device, the aggregated data ranking assigned to the IoT data.

A further embodiment provides an IoT gateway, comprising a communication interface; and an electronic processor communicatively coupled to the electronic processor. The electronic processor is configured to: receive, via the communication interface, IoT data captured by an IoT device; transmit, via the communication interface, the IoT data to a plurality of IoT analytics servers each providing a different IoT analytics service; receive, via the communication interface, acknowledgments including data rankings from the plurality of IoT analytics servers, each of the acknowledgments including a respective one of the data priority values rankings indicating an importance of the IoT data as an input to the IoT analytics service provided by a respective one of the IoT analytics servers; assign an aggregated data ranking for the IoT data based on the data rankings included in the acknowledgments received from the IoT analytics servers; and transmit, via the communication interface, to the IoT device, an electronic notification including the aggregated data ranking assigned to the IoT data.

Each of the above-mentioned embodiments will be discussed in more detail below, starting with example system and device architectures of the system in which the embodiments may be practiced, followed by an illustration of processing blocks for achieving an improved technical method, device, and system for ranking IoT data based on IoT analytics services. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular to FIG. 1, a communication system 100 is shown including an internet-of-things (IoT) gateway 110 configured to act as an interface between an IoT device 120 and a plurality of IoT analytics servers 130-1, 130-2, . . . 130-n. The plurality of IoT analytics servers 130-1 through 130-n can be interchangeably referred to, collectively, as analytics servers 130, and generically as an analytics server 130. The IoT gateway 110 may be any computing device implemented as a stand-alone physical unit or may alternatively be implemented as a logical unit in a cloud computing platform. Although only one IoT device 120 is shown, each IoT gateway 110 may serve as an interface for multiple IoT devices 120. In some embodiments, multiple IoT gateways 110 may be included in the system 100, where each IoT gateway 110 serves a separate set of IoT devices.

The IoT device 120 is any computing device that is embedded to or otherwise connected to an object to capture IoT data indicating the state of an object and/or an environment within which the object is located. An object may represent any thing for which IoT data can be captured and data analytics can be performed on the captured IoT data. The IoT devices 120 may be included in objects representing appliances, sensors, vehicles, controllers, actuators, and other physical components (e.g., engine, motor, compressor, pump, water tank, electric meter, door, camera etc.). In accordance with embodiments, the IoT device 120 includes at least an electronic processor, a communication interface supporting both broadband and narrowband connections, and a memory including executable instruction for communicating with the IoT gateway 110 and/or the analytics servers 130. The IoT device 120 can have an operating system or other software that can perform functionalities and executed applications. In accordance with some embodiments, the IoT device 120 captures IoT data (e.g., using sensor components) relative to a monitored object or environment and further transmits the IoT data to the IoT gateway 110, which in turn forwards the IoT data to different analytics servers 130. The IoT data may represent data values computed and/or measured by the IoT device 120 corresponding to one or more sensed parameters (e.g., water level, pump speed, water usage, power usage, weather, temperature, vehicle speed, face match, door status, traffic signal, weapon status, gunshot detection etc.) representing the state of one or more objects and/or the environment thereof. The data values captured by the IoT device 120 may be reported (e.g., by transmitting IoT data containing one or more data values to analytics servers 130 via the IoT gateway 110) in real-time as each data value (or multiple interrelated data values) is generated by the IoT device 120. Alternatively, the IoT device 120 may be programmed to capture and report IoT data containing data values at predefined time intervals. In accordance with some embodiments, the IoT device 120 reports a particular data value or combination of data values based on transmission rules locally maintained at the IoT device 120. As an example, a transmission rule may indicate that the IoT device 120 should report the IoT data only when there is a change of state with respect to a monitored parameter. The IoT device 120 may compare a currently captured IoT data with an IoT data captured immediately preceding the currently compared IoT data to determine whether there is a change of state with respect to a monitored parameter. As an example, assume that an IoT device 120 is monitoring a parameter indicating a water level in a tank and further the IoT device 120 has measured the current water level (e.g., at time 'T1' representing a current time) as '30' units. Also, assume that the IoT device 120 has previously measured water level (e.g., at time 'T0' prior to 'T1') as '5' units and that no other measurements have been captured between 'T0' and 'T1'. In this case, the IoT device 120 determines that there is a change of state in the water level (i.e., during a time period between T0 and T1) and accordingly determines to report the current water level measurement of '30' units to the analytics servers 130. In accordance with some embodiments, the IoT data reported by the IoT device 120 includes, for each data value (or combination of data values) included in the IoT data, a respective timestamp indicating a time at which the data value (or combination of data values) was captured.

In accordance with some embodiments, the IoT device 120 generates a message for reporting the IoT data to the analytics servers 130. The IoT device 120 transmits the message containing the IoT data to the IoT gateway 110 using either a broadband communication link 112 or a narrowband communication link 114. In accordance with some embodiments, the IoT device 120 transmits all IoT data using the broadband communication link 112 unless there is a failure in the broadband communication link 112, in which case, the IoT device 120 may use the narrowband communication link 114 for transmitting high priority IoT data (e.g., IoT data with an assigned rank greater than a predefined threshold). In some embodiments, the IoT device 120 transmits all captured IoT data using both broadband and narrowband communication links 112, 114 for providing data redundancy, but in case of failure in the broadband communication link 112, the IoT device 120 will use the narrowband communication link 114 for transmitting the high priority IoT data. In further embodiments, the IoT device 120 may use the broadband communication link 112 to transmit a first type or category of IoT data (e.g., high bandwidth data such as video analytics data) and the narrowband communication link 114 to transmit a second type or category of data (e.g., low bandwidth data such as water level measurement). In accordance with embodiments, when there is a failure in the broadband communication link 112, the IoT device 120, instead of reporting all IoT data via the narrowband communication link 114, will use an aggregated data ranking assigned to a particular IoT data to determine whether to use the narrowband communication link 114 for reporting the particular IoT data or alternatively to refrain from reporting the particular IoT data. The use of aggregated data ranking ensures that only high priority IoT data (i.e., priority of IoT data determined based on feedback from analytics servers 130) is reported via the narrowband communication link 114 for consumption by IoT analytics servers 130 whenever there is a failure in the broadband communication link 112.

In accordance with embodiments, the communication system 100 includes broadband and narrowband communication networks (not shown) to enable the IoT device 120 to establish broadband and/or narrowband communication links 112, 114 for reporting IoT data. The broadband and narrowband communication networks may accordingly include typical network components such as base stations, base station controllers, routers, switches, and the like, arranged, connected, and programmed to provide broadband and/or narrowband service to IoT device 120 in a manner known to those of skill in the relevant art.

In accordance with some embodiments, the IoT gateway 110 may include software applications or programs to pre-process the message containing IoT data received from the IoT device 120 prior to transmitting the IoT data to the analytics servers 130 for further processing and analysis. As an example, pre-processing of message received from the IoT device 120 may include changing the IoT data from one protocol format to another protocol format to enable communication between the IoT device 120 and the analytics servers 130, filtering IoT data for providing only relevant or priority data (e.g., based on aggregated ranking assigned to IoT data) to the respective analytics servers 130, classifying collected data or data packets based on various data fields included within the IoT data. In accordance with some embodiments, the IoT gateway 110 forwards the IoT data received from the IoT device 120 to analytics servers 130. In one embodiment, the IoT gateway 110 may append metadata (e.g., timestamp, temperature, weather data etc., obtained through other services) to the IoT data before forwarding the message to the analytics servers 130. In another embodiment, the IoT gateway 110 may provide metadata (e.g., in the form of acknowledgment to currently reported IoT data) directly to the IoT device 120 which then appends the metadata to IoT data that is to be subsequently reported to the analytics servers 130. In any case, when the analytics servers 130 receive IoT data reported by the IoT device 120, the analytics servers 130 process the IoT data for providing different analytics services to entities subscribed to receive such services. As an example, utility companies such as a water management company may subscribe to different analytics services to gain insights on water distribution, consumption, capacity, equipment failure, leakage, contamination, and the like. As another example, public safety agencies such as law enforcement, fire, emergency medical services etc., may also subscribe to analytics services to improve the speed and efficacy of emergency response.

In accordance with embodiments, each analytics server 130 may represent a computing device that is implemented as a standalone physical unit or alternatively implemented as a logical unit within a cloud computing platform. Each analytics server 130 is pre-programmed with an analytics engine that automatically analyzes IoT data reported by IoT devices 120 and further provides a respective analytics service. As an example, an analytics server 130-1 may be configured to provide an analytics service offering insights on water distribution optimization. An analytics server 130-2 may be configured to provide an analytics service offering insights on pump maintenance. An analytics server 130-3 may provide an analytics service offering insights on water usage. Public-safety agencies may similarly subscribe to different analytics services to enhance their situational awareness and decision making before responding to an incident. As an example, in the public-safety use context, an analytics server 130-4 may be configured to provide video analytics services (e.g., performing face recognition) based on video data reported by a camera-enabled IoT devices 120 and an analytics server 130-5 may be configured to provide an analytics service offering health-related insights about injured victims based on IoT data collected from IoT devices 120 embedded in objects such as medical equipment and activity trackers.

In accordance with embodiments, each analytics server 130 may provide feedback regarding the importance of particular IoT data (e.g., particular data values) as an input for providing a particular analytics service offered by the analytics server 130. In accordance with some embodiments, the analytics server 130 provides feedback in the form of a data ranking for a particular IoT data received from the IoT device 120. The feedback including the data ranking is included in an acknowledgment transmitted from the analytics server 130 to the IoT gateway 110. In one embodiment, the IoT gateway 110 aggregates the data rankings respectively received from the analytics servers 130 to determine an aggregated data ranking for the particular IoT data. The IoT gateway 110 then transmits, to the IoT device 120, an electronic notification including the aggregated data ranking assigned to the particular IoT data. In another embodiment, the IoT gateway 110 may not assign an aggregated data ranking, but instead will forward the respective data rankings received from the analytics servers 130 to the IoT device 120. In this embodiment, the IoT device 120 determines and assigns the aggregated data ranking to the particular IoT data based on the data rankings assigned by the respective analytics servers 130 to the particular IoT data. In any case, the IoT device 120 will store the aggregated data ranking assigned to the particular IoT data. If a matching IoT data (i.e., IoT data with the same data value as the particular IoT data) is subsequently captured by the IoT device 120, the IoT device 120 will use the aggregated data ranking assigned to the particular IoT data to determine whether to report the subsequently captured matching IoT data via the narrowband communication link 114 in case of a failure in the broadband communication link 112. In accordance with embodiments, in case of a failure in the broadband communication link 112, the IoT device 120 compares the aggregated data ranking assigned to the particular IoT data with a predefined threshold and transmits the subsequently captured matching IoT data via the narrowband communication link 114 only when the aggregated data ranking assigned to the particular IoT data is above the predefined threshold. Otherwise, if the aggregated data ranking assigned to the particular IoT data is not above the predefined threshold, then the IoT device 120 refrains from reporting the subsequently captured matching IoT data to the analytics servers 130.

Figure 2:
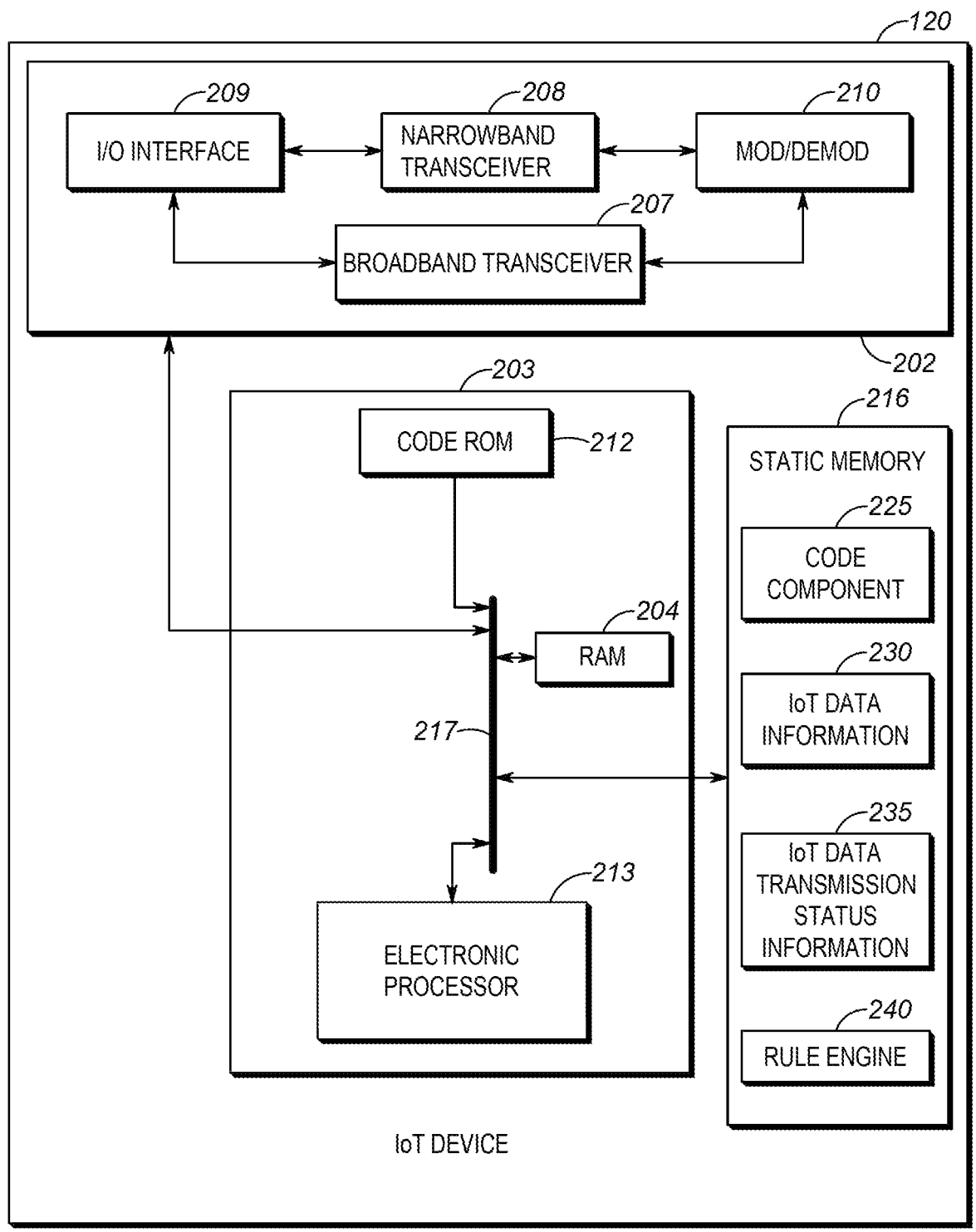
FIG. 2 is a block diagram of an internet-of-things (IoT) device shown in FIG. 1 in accordance with some embodiments.

FIG. 2 is an example functional block diagram of an IoT device 120 operating within the system 100 in accordance with some embodiments. Depending on the type of IoT device, the IoT device 120 may include fewer or additional components in configurations different from that illustrated in FIG. 2. As shown in FIG. 2, the IoT device 120 includes a communications unit 202 (also referred to as "communication interface") coupled to a common data and address bus 217 of a processing unit 203. The communications unit 202 sends and receives data to and from the IoT gateway 110 and/or the IoT analytics servers 130 in the system 100. The communications unit 202 may include one or more wired and/or wireless input/output (I/O) interfaces 209 that are configurable to communicate with other devices in the system 100. The communications unit further includes a broadband transceiver 207 and a narrowband transceiver 208. The broadband transceiver 207 is configured to transmit broadband data (e.g., IoT data captured by the IoT device 120) via a broadband communication link 112. The broadband communication link 112 may be established using private or public wireless networks such as 4G Long Term Evolution (LTE) networks, 5G networks, or WiFi networks. The narrowband transceiver 208 is configured to transmit narrowband data (e.g., IoT data captured by the IoT device 120) via the narrowband communication link 114. The narrowband communication link 114 may be established using a narrowband communication network that operates, for example, according to a Land Mobile Radio (LMR) specification or protocol including, but not limited to, Project 25 (P25), ASTRO 25, Terrestrial Trunked Radio (TETRA), and Digital Mobile Radio (DMR). The term "narrowband" used herein is defined as a limited-capacity transmission channel (e.g., 25 kHz or 12.5 kHz bandwidth channels) as that used for transmitting low data rate IoT signals. In general, any channel technology that limits the data rate to a few kilobits per second (e.g., 10 Kbps) can be regarded as a narrowband communication link. For example, LoRa (long range low power wireless communications technology) technology that operates on 125, 250, or 500 KHz can still limit transmission to 10 Kbps to provide low data rate connectivity for IoT devices 120. The term "broadband" used herein is defined as a high-capacity transmission technique using a wide range of frequencies, which enables a large amount of IoT data to be communicated simultaneously. The broadband and narrowband transceivers 207, 208 may each be coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202, such as for receipt by the IoT gateway 110.

Figure 7:
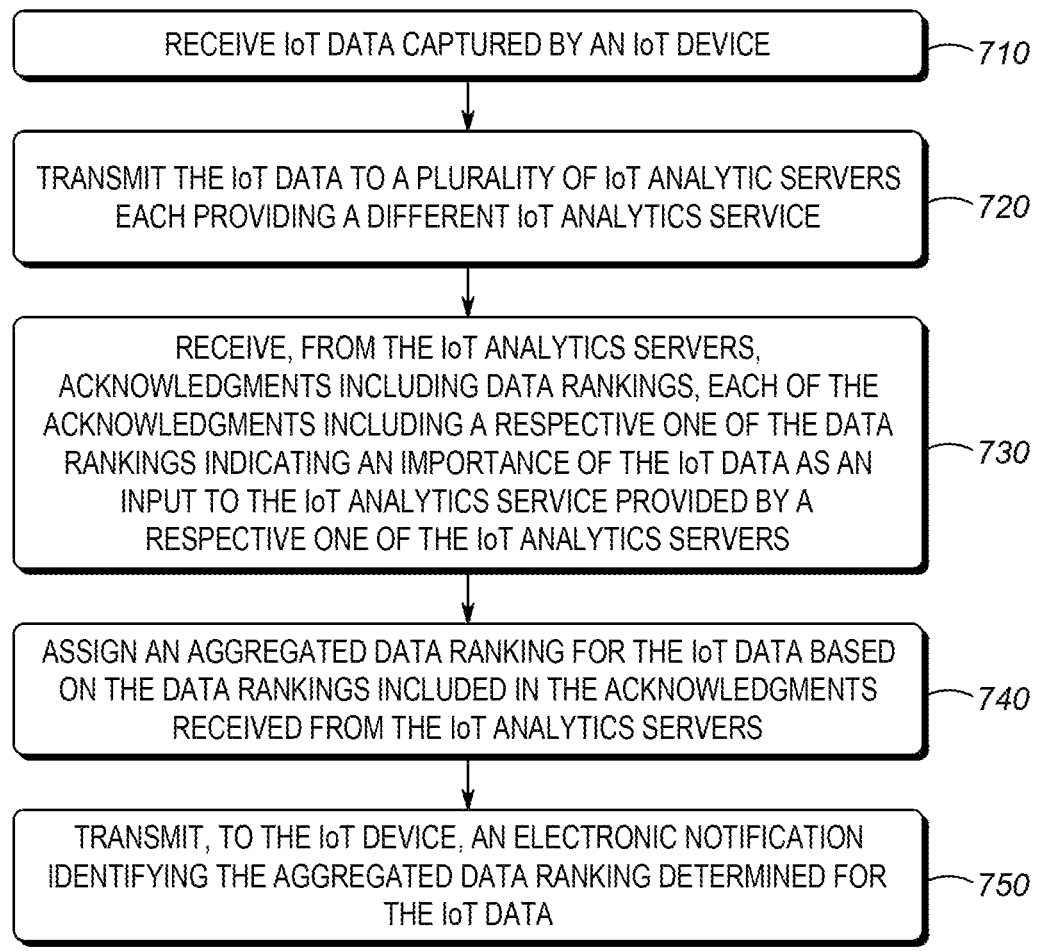
FIG. 7 illustrates a flowchart of a process for ranking IoT data based on IoT analytics services in accordance with some embodiments.
Figure 8:
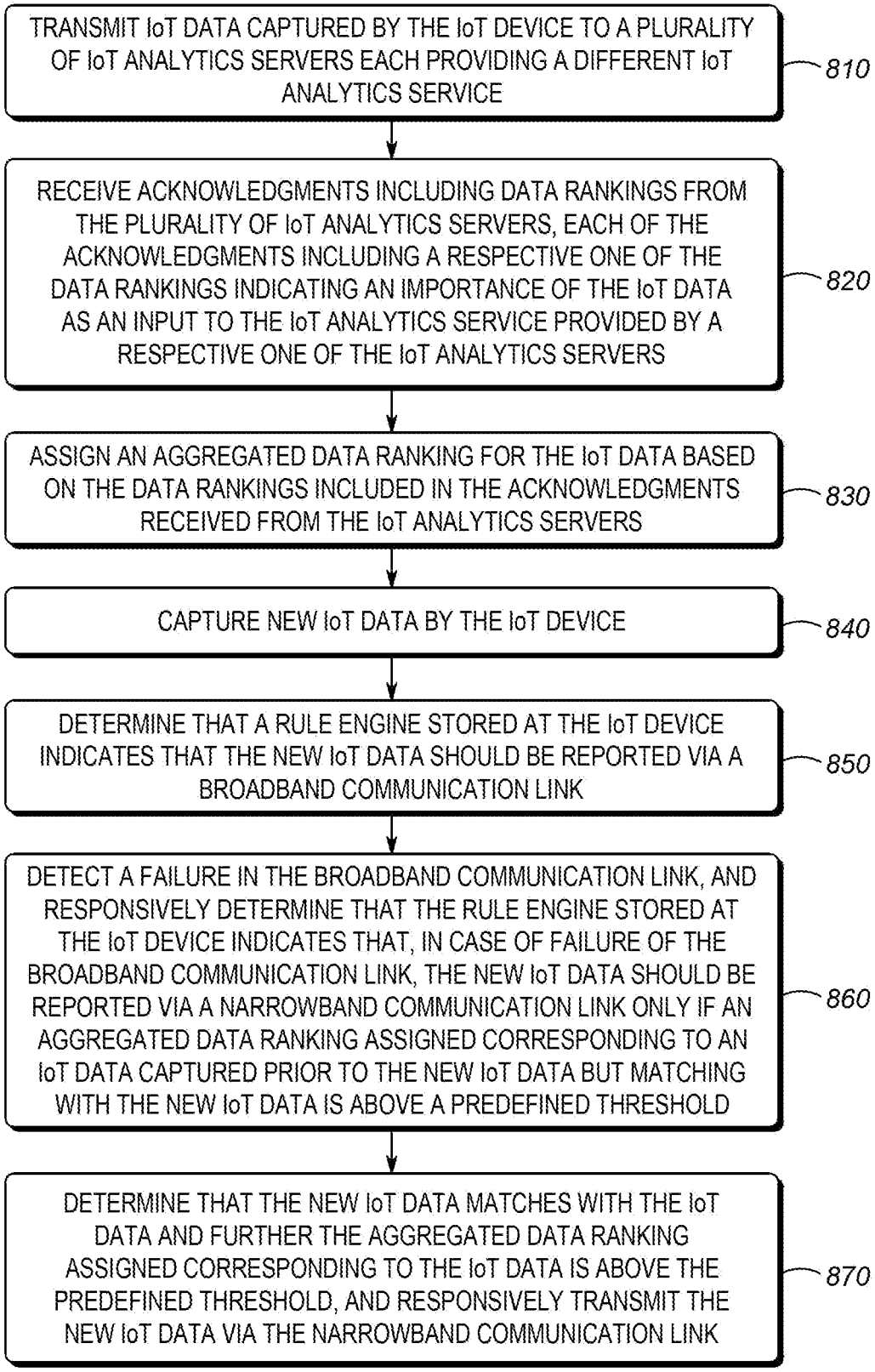
FIG. 8 illustrates a flowchart of another process for ranking IoT data based on IoT analytics services in accordance with some embodiments.

Static memory 216 may store operating code 225 for the electronic processor 213 that, when executed, performs one or more of the blocks set forth in FIGS. 7 and 8 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In accordance with some embodiments, the static memory 216 stores IoT data information 230 including IoT data representing one or more data values measured corresponding to an object (e.g., water tank) or an environment being monitored by the IoT device 120. The IoT data information 230 may be stored in any suitable data format or structure. An example structure of IoT data information 230 maintained at the IoT device 120 is shown in FIG. 3. Referring to FIG. 3, the IoT data information 30 includes an IoT data identifier 310, a timestamp 320, one or more data values measured corresponding to one or more objects (e.g., water level measurement 330, pressure measurement 340, pump engine speed measurement 350), or environmental parameters (e.g., weather 360) being monitored by the IoT device 120. In one embodiment, each time an IoT device 120 captures IoT data representing a change of state with respect to a particular parameter monitored by the IoT device 120, the IoT device 120 updates the IoT data information 230 to include the data value (e.g., water level measurement 330 of '5' units) as well as a timestamp 330 (e.g., time 'T1') representing the time at which the data value was measured by the IoT device 120. The IoT data identifier 310 represents an identifier assigned to a given data value (or combination of data values) measured by the IoT device 120. In accordance with some embodiments, the IoT device 120 will create a new IoT data identifier 310 only when a particular data value (or combination of data values, for example, water level measurement 330 and weather 360) measured by the IoT device 120 has not been previously measured by the IoT device 120. In other words, in these embodiments, if a particular data value (or combination of data values) currently measured by the IoT device 120 with respect to one or more object parameters has already been captured with respect to the same one or more object parameters, then the IoT device 120 assigns the same IoT data identifier to both measurements. For example, in FIG. 3, the IoT device 120 has assigned a unique identifier 'D1' to represent water level measurement of '5' units detected at 'T1' and 'T6'. Similarly, the IoT device 120 has assigned a unique identifier 'D2' to represent water level measurement of '30' units detected at 'T2', 'T5', and 'T8' and a unique identifier 'D3' to represent water level measurement of '25' units detected at 'T3', 'T4', and 'T7'. In accordance with some embodiments, the IoT device 120 may vectorize IoT data representing a dataset including multiple interrelated data values to remove any interdependency between multiple object parameters or environmental parameters. In these embodiments, data values are interrelated to each other when a change in one data value measured corresponding to one object parameter or environmental parameter may have a correlation with a change in another data measured corresponding to another object parameter or environmental parameter. For example, a change in weather condition (e.g., from 'Sunny' weather to 'Rainy' weather) may cause the water levels to increase in a water tank. Accordingly, in this example, the water level measurement is said to be interrelated to weather condition. In some embodiments, the IoT data includes a vectorized dataset of multiple interrelated data values each measured corresponding to a state of a respective one of multiple objects monitored by the IoT device or an environment within which the respective one of multiple objects monitored by the IoT device 120 is located. In these embodiments, the IoT device 120 may assign a unique IoT data identifier to each unique combination of interrelated data values and further a single aggregated data ranking may be assigned to each unique combination of interrelated data values. For example, the IoT device 120 may assign a unique identifier 'D4' (not shown) to represent a dataset containing a first set of interrelated data values {'5', '42', '36', 'Sunny'}, where the data values respectively represent water level measurement 330, pressure measurement 340, pump engine speed measurement 350, and weather 360. Similarly, the IoT device 120 may assign a unique identifier 'D5' (not shown) to represent a dataset containing a second set of data values {'30', '42', '36', 'Rainy') representing the same parameters. The IoT device 120 may assign a unique identifier 'D6' to represent a dataset containing a third set of data values {'25', '42', '36', 'Sunny} representing the same parameters. In other words, in these embodiments, the IoT device 120 may create a new identifier as long as a currently measured data value corresponding to at least one monitored parameter is different from any of the data values previously measured corresponding to the same monitored parameter. In these embodiments, the IoT device 120 may assign different identifiers 'D4', 'D5', 'D6' based on the change in the water level measurement 330 and weather data 360 even though pressure measurement 340 and pump engine speed measurement 350 have remained constant during the time period between 'T1' and 'T8'. Accordingly, in these embodiments, a single aggregated data ranking is assigned corresponding to each unique vectorized dataset of multiple interrelated data values.

In accordance with some embodiments, the static memory 216 further stores IoT data transmission status information 235 that tracks transmission status for IoT data captured by the IoT device 120 at different points in time. The IoT data transmission status information 235 may be stored in any suitable data format or structure. An example structure of IoT data transmission status information 235 maintained at the IoT device 120 is shown in FIG. 4. Now referring to FIG. 4, the IoT data transmission status information 235 includes IoT data identifier 410, time stamp 420, IoT data representing one or more measured data values (e.g., water level measurement 430), stored data ranking 440 previously assigned to a particular IoT data with the same data value, broadband connection status 450, transmission status 460, and data ranking 470 assigned to a particular IoT data after transmission. The IoT data identifier 410, time stamp 420, and IoT data i.e., water level measurement 430 shown in FIG. 4 includes information similar to the IoT data identifier 310, time stamp 320, and water level measurement 330, respectively, shown in FIG. 3. The stored data ranking 440 represents an aggregated data ranking previously assigned to a particular IoT data with the same data value. As an example, the IoT data identifier 'D1' with water level measurement of '5' units captured at time 'T6' has a stored data ranking 440 of '30' because the IoT device 120 has previously captured the same data value (i.e., water level measurement of 5 units) at time 'T1' and further it has been assigned (by either the IoT device 120 or IoT gateway 110) an aggregated data ranking 235 of '30' based on feedback received from the analytics servers 130. Similarly, the IoT data identifier 'D2' with water level measurement of '30' units captured at 'T5' and 'T8' has a stored data ranking of '55' because the IoT device 120 previously captured the same data value (i.e., water level measurement of '30' units) at time 'T2' and further it has been assigned an aggregated data ranking of 55 based on feedback received from the analytics servers 130. The IoT data identifier 'D3' with water level measurement of '25' units captured at time points 'T4' and 'T7' has a stored data ranking of '35' because the IoT device 120 previously captured the same data value (i.e., water level measurement of '25' units) at time 'T3' and further it has been assigned an aggregated data ranking of '35' based on feedback received from the analytics servers 130. The data ranking 470 represents an aggregated data ranking determined (by either the IoT device 120 or IoT gateway 110) based on feedback received from the analytics servers 130 in response to transmitting the particular IoT data. The broadband connection status 450 indicates whether or not there has been a failure with respect to establishing a broadband communication link 112. The transmission status 460 indicates whether or not the IoT data including a particular one or more data values was transmitted. If IoT data was transmitted, the transmission status 460 further indicates whether the IoT data was transmitted via a broadband communication link 112 or via a narrowband communication link 114. In accordance with some embodiments, the IoT device 120 may transmit the IoT data using the narrowband communication link 114 according to certain conditions specified in a rule engine 240 stored within the static memory 216 of the IoT device 120.

Returning to FIG. 2, in accordance with some embodiments, the static memory 216 maintains a rule engine 240 specifying a number of transmission rules for reporting new IoT data captured by the IoT device 120 to the analytics servers 130. In accordance with some embodiments, the rule engine 240 includes a first transmission rule that requires new IoT data to be reported to analytics servers 130 only when the new IoT data represents a change of state, for example, relative to an immediately preceding IoT data captured by the IoT data. As an example, as shown in FIG. 4, the transmission status 460 corresponding to the IoT data 'D3' (with water level measurement 430 of '25' units) captured at time 'T3' indicates that the IoT data 'D3' was "transmitted" because there was a change of state with respect to the water level between 'T2' and 'T3' (i.e., water level has changed from '30' units at time 'T2' to '25' units at time 'T3'). On the other hand, the transmission status 460 corresponding to the IoT data identifier 410 'D3' (with water level measurement 430 of '25' units) captured at time 'T4' indicates that the IoT data was "not transmitted" (even though the broadband connection was "working" at time 'T4') because there has been no change of state with respect to the water level between 'T3' and 'T4'.

In accordance with some embodiments, the rule engine 240 further includes a second transmission rule that specifies types or categories of IoT data that should be transmitted via the broadband communication link 112 unless there is a failure in the broadband communication link 112. As an example, the rule engine 240 may specify that all high bandwidth IoT data (e.g., video analytics data) should be reported (i.e., by default) via the broadband communication link 112 and further all low bandwidth IoT data (e.g., water level measurement, pressure measurement etc.) should be reported via the narrowband communication link 114. Alternatively, the rule engine 240 may substitute the second transmission rule with another rule that specifies that all types of IoT data should be transmitted via both broadband communication link 112 and narrowband communication link 114 to provide data redundancy unless there is a failure in the broadband communication link 112.

In accordance with some embodiments, the rule engine 240 further includes a third transmission rule that defines a condition under which new IoT data (e.g., IoT data that, by default, should be transmitted through the broadband communication link 112) should be transmitted via the narrowband communication link 114 in case of a failure in the broadband communication link 112. In accordance with some embodiments, the third transmission rule specifies that new IoT data should be reported via the narrowband communication link 114 (in case of failure in the broadband communication link 112) only when an aggregated data ranking assigned to any IoT data captured prior to the new IoT data but matching with the new IoT data is above a predefined threshold. The predefined threshold may be maintained in the rule engine 240 and further the threshold may correspond to either a user-specified threshold or a system-configured threshold. As an example, as shown in FIG. 4, the transmission status 460 corresponding to the IoT data captured at time periods 'T1', 'T2', 'T3', 'T4', and 'T6' indicates that the IoT data was transmitted via the broadband communication link 112 (as specified by the first transmission rule of the rule engine 240) as there was no failure in broadband connection during 'T1', 'T2', 'T3', 'T4', and 'T6'. The transmission status 460 corresponding to IoT data 'D2' (i.e., water level measurement 430 of '30' units) captured at time 'T5' indicates that the IoT data 'D2' was transmitted via the narrowband communication link 114 (as specified by the third transmission rule of rule engine 240) as there was a failure in the broadband connection at time 'T5' and further an aggregated data ranking 440 of '55' assigned to a prior IoT data 'D2' captured at time 'T2' with the same data value of '30' units is above a predefined threshold of '50'. On the other hand, the transmission status 460 corresponding to IoT data 'D3' (i.e., water level measurement of '25' units) captured at time 'T7' indicates that the IoT data 'D3' was "not transmitted" via the broadband communication link 112 (because there was a failure in the broadband connection at time 'T7') or the narrowband communication link 114 (because the condition specified by the third transmission rule of the rule engine 240 is not satisfied since the aggregated data ranking of '35' assigned to a prior IoT data 'D3' captured at 'T3' with the same data value '25' units is not above the predefined threshold of '50').

Figure 5:
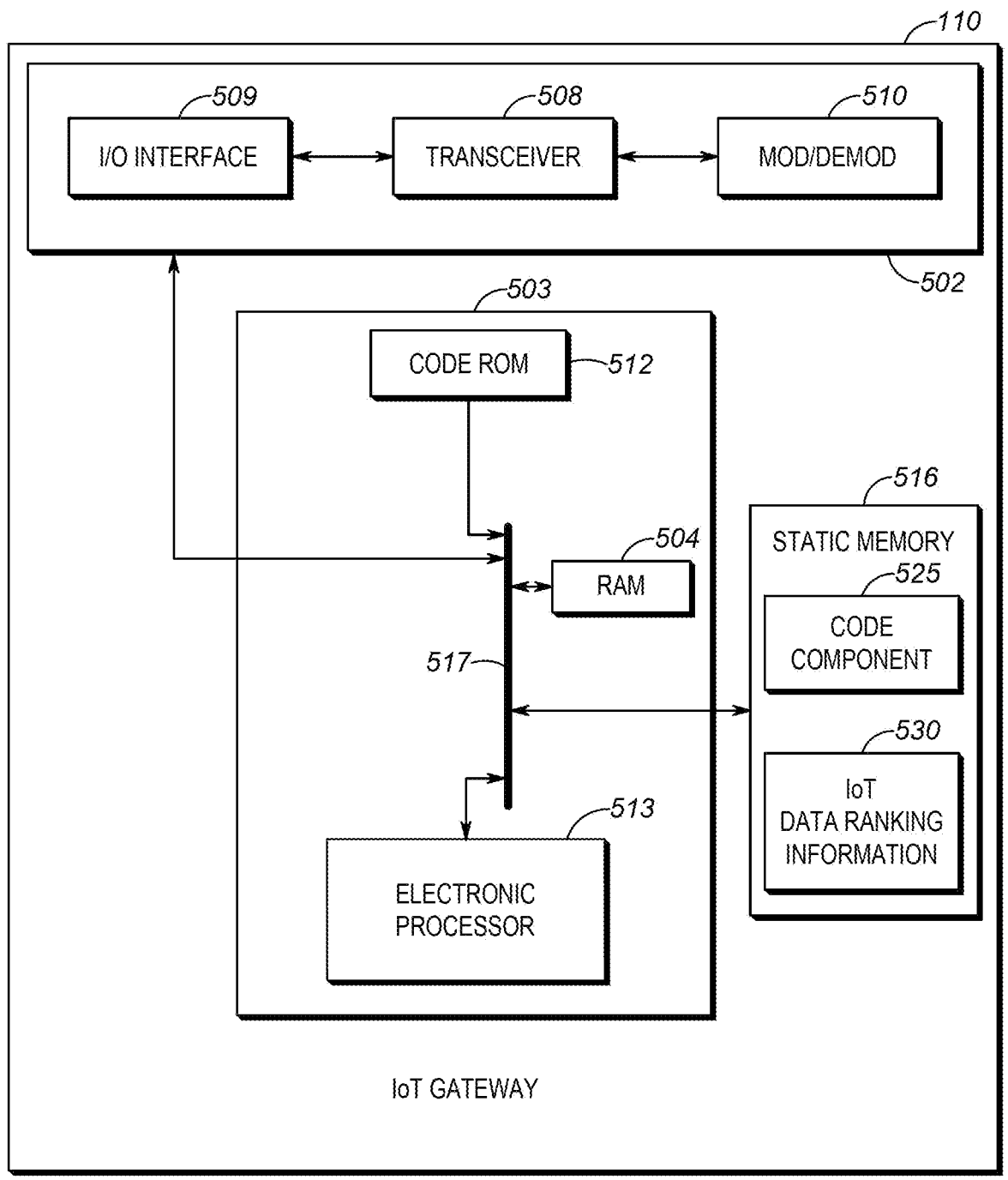
FIG. 5 is a block diagram of an IoT gateway shown in FIG. 1 in accordance with some embodiments.

FIG. 5 is an example functional block diagram of an IoT gateway 110 operating within the system 100 in accordance with some embodiments. The IoT gateway 110 may be a distributed computing device across two or more of the foregoing (or multiple of a same type of one of the foregoing) and linked via a wired and/or wireless communication link(s). The IoT gateway 110 may include fewer or additional components in configurations different from that illustrated in FIG. 5.

As shown in FIG. 5, the IoT gateway 110 includes a communications unit 502 coupled to a common data and address bus 517 of a processing unit 503. The communications unit 502 sends and receives data to and from other devices (e.g., IoT device(s) 120 and IoT analytics servers 130) in the system 100. The communications unit 502 may include one or more wired and/or wireless input/output (I/O) interfaces 509 that are configurable to communicate with other devices in the system 100. For example, the communications unit 502 may include one or more wireless transceivers 508, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 502 may additionally or alternatively include one or more wireline transceivers 508, such as an Ethernet transceiver, a USB transceiver, or similar transceiver configurable to communicate via a twisted pair wire, a coaxial cable, a fiber-optic link, or a similar physical connection to a wireline network. The transceiver 508 is also coupled to a combined modulator/demodulator 510.

The processing unit 503 may include an encoder/decoder with a code Read Only Memory (ROM) 512 coupled to the common data and address bus 517 for storing data for initializing system components. The processing unit 503 may further include an electronic processor 513 (for example, a microprocessor, a logic circuit, an application-specific integrated circuit, a field-programmable gate array, or another electronic device) coupled, by the common data and address bus 517, to a Random Access Memory (RAM) 504 and a static memory 516. The electronic processor 513 may generate electrical signals and may communicate signals through the communications unit 502, such as for receipt by the IoT device(s) 120 or IoT analytic servers 130.

Static memory 516 may store operating code 525 for the electronic processor 513 that, when executed, performs one or more of the blocks set forth in FIG. 7 and the accompanying text(s). The static memory 516 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In accordance with some embodiments, the static memory 516 further maintains IoT data ranking information 530 in any suitable data format or structure. An example structure of IoT data ranking information 530 is shown in FIG. 6.

Now referring to FIG. 6, the IoT data ranking information 530 includes IoT data 610 representing one or more data values (e.g., water level measurement and weather) and/or an IoT data identifier assigned to the one or more data values, rankings 620, 630, 640 received from the respective analytics servers 130, and an aggregated data ranking 650. The IoT data 610 identifies one or more data values reported corresponding to one or more object or environmental parameters monitored by the IoT device 120. The rankings 620, 630, 640 each identify a ranking assigned by a respective one of the analytics servers 130 based on the importance of a particular data value (included in the IoT data) for providing the respective one of the analytics services. The aggregated data ranking 650 identifies the ranking assigned by the IoT gateway 110 based on aggregating the rankings respectively assigned by the analytics servers 130 in response to processing a particular IoT data. For example, assume that an analytics server 130-1 provides a first analytics service offering insights on water distribution optimization, an analytics server 130-2 provides a second analytics service offering insights on pump maintenance, and an analytics server 130-3 provides a third analytics service offering water usage insights. Each time an IoT device 120 reports particular IoT data to the analytics servers 130-1, 130-2, and 130-3 via the IoT gateway 110, the analytics servers 130-1, 130-2, and 130-3 respectively process the particular IoT data and further provide a respective ranking indicating the importance of the particular IoT data as an input to the IoT analytics service provided by the respective analytics servers 130-1, 130-2, and 130-3. In the example shown in FIG. 6, the analytics server 130-1 has assigned a rank of '100' to the IoT data representing a water level measurement of '30' units and 'Rainy' weather, the analytics server 130-2 has assigned a rank of '15' to the IoT data representing a water level measurement of '30' units and 'Rainy' weather, and the analytics server 130-3 has assigned a rank of '50' to the IoT data representing a water level measurement of '30' units and 'Rainy' weather. In other words, the analytics server 130-1 has determined that the particular IoT data with water level measurement of '30' units and 'Rainy' weather is a critical factor for providing an analytic service related to water distribution optimization and accordingly has assigned a higher rank (or a score) of "100" to that particular IoT data. On the other hand, the analytics server 130-2 has determined that the particular IoT data with water level measurement of '30' units and "Rainy" weather is a less critical factor for providing an analytic service related to water distribution optimization and accordingly has assigned a lower rank (or a score) of '15' to that particular IoT data. In accordance with embodiments, the IoT gateway 110 receives the rankings from the analytics servers 130 and then assigns an aggregated data ranking 650, for example, by computing an average of the rankings respectively received from the analytics servers 130. The IoT gateway 110 then updates the IoT data ranking information 530 to include the aggregated data ranking 650 corresponding to that particular IoT data. In the example shown in FIG. 6, the IoT gateway 110 has computed an aggregated data ranking of '55' for the particular IoT data with water level measurement of '30' units and 'Rainy' weather based on an average of the data rankings '100', '15', '50', respectively received from the analytics servers 130-1, 130-2, 130-3.

In one embodiment, the IoT gateway 110 forwards the acknowledgments including the individual rankings received from the respective analytics servers 130 to the IoT device 120. In this embodiment, the IoT device 120 (instead of the IoT gateway 110) determines an aggregated data ranking to be assigned to a particular IoT data by computing an average of the data rankings included in the acknowledgments forwarded by the IoT gateway 110. In this embodiment, the IoT device 120 may similarly maintain IoT data ranking information 530 at the static memory 216 to track the aggregated data rankings assigned to different IoT data.

Turning now to FIG. 7, a flowchart diagram illustrates a process 700 of ranking IoT data based on IoT analytics services. While a particular order of processing steps, message receptions, and/or message transmissions is indicated in FIG. 7 as an example, timing and ordering of such steps, receptions, and transmissions may vary where appropriate without negating the purpose and advantages of the examples set forth in detail throughout the remainder of this disclosure. The IoT gateway 110 shown in FIG. 1 and FIG. 5, and embodied as a singular computing device or distributed computing device may execute process 700 via an electronic processor 513.

The IoT gateway 110 may execute the process 700 at power-on, at some predetermined periodic time period thereafter, in response to a trigger raised locally at the IoT gateway 110 via an internal process or via an input interface or in response to a trigger from an external device to which the IoT gateway 110 is communicably coupled, among other possibilities.

The process 700 of FIG. 7 need not be performed in the exact sequence as shown and likewise various blocks may be performed in different order or alternatively in parallel rather than in sequence. The process 700 may be implemented on variations of the system 100 of FIG. 1 as well.

At block 710, the IoT gateway 110 receives IoT data captured by an IoT device 120. In accordance with embodiments, the IoT gateway 110 receives a message containing the IoT data captured by the IoT device 120. The message may include, among other things, one or more data values representing the state of an object and/or an environment within which an object monitored by the IoT device 120 is located. In one embodiment, the message may additionally include one or more of: a device identifier uniquely identifying the IoT device 120, a message identifier uniquely identifying the message containing the IoT data, an IoT data identifier uniquely identifying one or more data values representing the IoT data, an object identifier identifying the object for which IoT data is being reported, a timestamp indicating the time at which the IoT data was captured, location of the IoT device 120 and/or the object being monitored, and type and/or unit of the one or more data values (e.g., water level, pressure, temperature, cycles, weight etc.). The one or more data values may correspond to a water level measurement, a pressure measurement, a pump engine measurement, weather data, a door status, temperature, facial recognition match, traffic signal state, or any other object or environmental parameter monitored by the IoT device 120. In accordance with some embodiments, the IoT gateway 110 receives a particular IoT data from the IoT device 120 only when the particular IoT data contains a data value (or interrelated data values) indicating a change of state relative to a previously measured data value (e.g., an immediately preceding IoT data) for the same object or environmental parameter being monitored by the IoT device 120. In one embodiment, the IoT gateway 110 may receive IoT data at periodic intervals from the IoT device 120 irrespective of whether the IoT data contains a data value indicating a change of state relative to a previously measured data value. In another embodiment, the IoT gateway 110 may receive IoT data as and when it is captured by the IoT device 120 and further irrespective of whether the IoT data contains a data value indicating a change of state relative to a previously measured data value.

At block 720, the IoT gateway 110 transmits the IoT data to IoT analytics servers 130. In one embodiment, the IoT gateway 110 may maintain a database identifying a list of analytics servers 130 that have subscribed to receive IoT data from a particular IoT device 120. As an example, the IoT gateway 110 may identify that analytics servers 130-1, 130-2, and 130-3 are subscribed to receive IoT data captured by the IoT device 120 and accordingly forwards the IoT data received from the IoT device 120 to analytics servers 130-1, 130-2, and 130-3. In one embodiment, the IoT gateway 110 may add metadata, for example, an additional data value representing an environmental parameter to the message containing the IoT data before forwarding the message to the analytics servers 130. In this embodiment, the IoT gateway 110 may obtain metadata (e.g., weather data) from sources other than the IoT device 120. In this embodiment, an aggregated data ranking may be assigned to a combination of a first data value (e.g., water level measurement) received from the IoT device 120 and a second data value (e.g., weather data) added by the IoT gateway 110.

At block 730, the IoT gateway 110 receives acknowledgments including data rankings from the analytics servers 130. Each of the acknowledgments includes a respective one of the data rankings indicating an importance of the IoT data as an input to the IoT analytics service provided by a respective one of the analytics servers 130. The acknowledgment received from each analytics server 130 may include, in addition to a data ranking (e.g., a numerical value), one or more of: a service identifier uniquely identifying the analytics service provided by the particular analytics server 130 sending the acknowledgment, a message identifier uniquely identifying the message in response to which the acknowledgement is transmitted, and an IoT data identifier uniquely identifying one or more data values representing the IoT data. In accordance with embodiments, each analytics server 130 may compute a data ranking to be assigned to a particular IoT data based on the level of importance of one or more data values as an input for providing a respective analytics service. As an example, an analytics server 130-2 providing insights on pump maintenance may weigh measurements (e.g., temperature, noise level, lubricant level, vibration level) at a predefined range (e.g., measurements above a threshold) as a critical input for providing its analytics service and therefore may assign a higher rank for data values representing such measurements.

In accordance with some embodiments, the IoT gateway 110 maintains IoT data ranking information 530 (see FIG. 6) to track the rankings respectively included in the acknowledgments received from the analytics servers 130 for a particular IoT data reported to the analytics servers 130. Briefly referring to the example shown in FIG. 6, suppose the IoT data 610 captured by the IoT device 120 indicates a water level of '30' units during a 'Rainy' weather and the IoT gateway 110 has forwarded the IoT data 610 to the analytics servers 130-1, 130-2, and 130-3. In this example, the analytics server 130-1 that provides a first analytic service offering insights on water distribution optimization may determine that the IoT data 610 indicating a water level of '30' units during a 'Rainy' weather is an important input for providing the first analytics service and accordingly may assign a highest score of '100' to the IoT data 610. Accordingly, the analytics server 130-1 transmits an acknowledgment including a ranking of '100' to the IoT gateway 110.

The analytics server 130-2 that provides a second analytic service offering insights on pump maintenance may determine that the IoT data 610 indicating a water level of '30' units during a 'Rainy' weather is not a critical input (for example, when compared to measurements such as pump temperature, noise level etc.) for providing the second analytics service and accordingly may assign a lower score of '15' to the IoT data 610. Accordingly, the analytics server 130-2 transmits an acknowledgment including a ranking of '15' to the IoT gateway 110. The IoT gateway 110 may further receive an acknowledgment including a ranking of '50' from the analytics server 130-3 that provides a third analytics service offering insight on water usage.

Next, at block 740, the IoT gateway 110 assigns an aggregated data ranking for the particular IoT data based on the data rankings included in the acknowledgments respectively received from the analytics servers 130. In accordance with some embodiments, the IoT gateway 110 determines an aggregated data ranking by computing an average of the data rankings included in the acknowledgments received from the IoT analytics servers 130. FIG. 6 provides an example of aggregated data ranking assigned to different IoT data. For example, the IoT data indicating a water level measurement of '5' units during 'Sunny' weather is assigned an aggregated data ranking of '30' by averaging the data rankings '40', '15', '15' received from the analytics servers 130-1, 130-2, and 130-3, respectively. The IoT data indicating a water level measurement of '30' units during 'Rainy' weather is assigned an aggregated data ranking of '55' by averaging the data rankings '100', '15', and '50' received from the analytics servers 130-1, 130-2, and 130-3, respectively. The IoT data indicating a water level measurement of '50' units during 'Sunny' weather is assigned an aggregated data ranking of '35' by averaging the data rankings '50', '15', '40' received from the analytics servers 130-1, 130-2, and 130-3, respectively. In other embodiments, the IoT gateway 110 may aggregate the data rankings received from the analytics servers 130 using mathematical functions other than an average function.

At block 750, the IoT gateway 110 transmits an electronic notification to the IoT device 120. The electronic notification includes the aggregated data ranking assigned to the particular IoT data. In one embodiment, the electronic notification includes, in addition to an aggregated data ranking, a message identifier uniquely identifying the message (through which the IoT data was reported from the IoT device 120 to the IoT gateway 110) in response to which the electronic notification is transmitted or an IoT data identifier uniquely identifying one or more data values representing the IoT data. The message identifier or IoT data identifier is included in the electronic notification to enable the IoT device 120 to accurately link the aggregated data ranking to a particular IoT data (e.g., a particular data value or combination of data values). In one embodiment, the IoT gateway 110 may add metadata, for example, an additional data value representing an environmental parameter to the electronic notification before forwarding the electronic notification to the IoT device 120. In this embodiment, the IoT gateway 110 may obtain metadata (e.g., weather data) from sources other than the IoT device 120. In this embodiment, the IoT device 120 may report the metadata received from the IoT gateway 110 in a future communication along with a subsequently captured IoT data to the analytics servers 130.

Briefly referring to FIG. 4, the IoT device 120 may update the IoT data transmission status information 235 to include the aggregated data ranking 470 assigned to a particular IoT data. As an example, when the IoT device 120 receives an electronic notification indicating an aggregated data ranking of '55' for the IoT data 'D2' from the IoT gateway 110, the IoT device 120 updates the IoT data transmission status information 235 to indicate that the IoT data 'D2' (representing water level measurement 430 of '30' units') captured time 'T2' is assigned an aggregated data ranking 470 of '55'. The IoT device 120 will then use the aggregated data ranking 470 assigned to the IoT data 'D2' in accordance with the rule engine 240 to determine whether to report new IoT data (e.g., IoT data 'D2' captured at time 'T5' with the same data value of '30' units) via the narrowband communication link 114 in case of a failure in the broadband communication link 112.

Turning now to FIG. 8, a flowchart diagram illustrates a process 800 of ranking IoT data based on IoT analytics services. While a particular order of processing steps, message receptions, and/or message transmissions is indicated in FIG. 8 as an example, timing and ordering of such steps, receptions, and transmissions may vary where appropriate without negating the purpose and advantages of the examples set forth in detail throughout the remainder of this disclosure. The IoT device 120 shown in FIG. 1 and FIG. 2, may execute process 800 via an electronic processor 213. The IoT device 120 may execute the process 800 at power-on, at some predetermined periodic time period thereafter, in response to a trigger raised locally at the IoT device 120 via an internal process or via an input interface or in response to a trigger from an external device to which the IoT device 120 is communicably coupled, among other possibilities.

The process 800 of FIG. 8 need not be performed in the exact sequence as shown and likewise various blocks may be performed in different order or alternatively in parallel rather than in sequence. The process 800 may be implemented on variations of the system 100 of FIG. 1 as well.

At block 810, the IoT device 120 transmits IoT data captured by the IoT device 120 to analytics servers 130 each providing a different IoT analytics service. In one embodiment, the IoT device 120 may maintain a database identifying a list of analytics servers 130 subscribed to receive IoT data from a particular IoT device 120. As an example, the IoT device 120 may identify that analytics servers 130-1, 130-2, and 130-3 are each subscribed to receive IoT data captured by the IoT device 120 and accordingly transmits a message containing the IoT data to each of the analytics servers 130-1, 130-2, and 130-3. The message may include, among other things, one or more data values representing the state of an object (e.g., water tank) and/or an environment (e.g., weather data) within which an object monitored by the IoT device 120 is located. In one embodiment, the message may additionally include one or more of: a device identifier uniquely identifying the IoT device 120, a message identifier uniquely identifying the message containing the IoT data, an IoT data identifier uniquely identifying one or more data values representing the IoT data, an object identifier identifying the object for which IoT data is being reported, a timestamp indicating the time at which the IoT data was captured, location of the IoT device 120 and/or the object being monitored, and type and/or unit of the one or more data values (e.g., water level, pressure, temperature, cycles, weight etc.). For example, the one or more data values represent a water level measurement, a pressure measurement, a pump engine measurement, weather data, a door status, temperature, facial recognition match, traffic signal state, or any other object or environmental parameter monitored by the IoT device 120. In the example shown in FIG. 4, when the IoT device 120 captures water level measurement of '5' units at time 'T1', the IoT device 120 may generate a message containing a data value of '5' units representing the water level measurement 430 and may further transmit the message to analytics servers 130 that are subscribed to receive the IoT data representing the water level measurement 430. In one embodiment, the IoT device 120 may transmit IoT data at periodic intervals to the analytic servers 130. In another embodiment, the IoT device 120 may transmit IoT data as and when it is captured by the IoT device 120.

In accordance with some embodiments, the IoT device 120 may transmit the message containing the IoT data to the analytics servers 130 via the IoT gateway 110. In these embodiments, the IoT gateway 110 pre-processes the message containing the IoT data prior to transmitting the IoT data captured by the IoT device 120 to the analytics servers 130. In another embodiment, the IoT device 120 may be configured to directly communicate (i.e., without the IoT gateway 110 acting as an interface between the IoT device 120 and the analytics servers 130) the captured IoT data to the analytics servers 130. In any case, the IoT device 120 transmits the captured IoT data either via the broadband communication link 112 or the narrowband communication link 114 in accordance with the transmission rules defined in the rule engine 240.

In accordance with some embodiments, a first transmission rule defined in the rule engine 240 requires the IoT device 120 to transmit IoT data to analytics servers 130 only when the IoT data represents a change of state relative to a previously captured IoT data. In these embodiments, the IoT device 120 may compare a data value represented by a recently captured IoT data with a data value represented by IoT data that immediately precedes the recently captured IoT data. If two data values are not different, then the IoT device 120 determines that there is no change of state in the IoT data and accordingly refrains from transmitting the recently captured IoT data to the analytics servers 130. On the other hand, if the two data values are different, the IoT device 120 determines that there is a change of state in the IoT data and accordingly transmits the IoT data to the analytics servers 130. In accordance with some embodiments, a second transmission rule defined in the rule engine 240 may further require certain categories of IoT data (e.g., high bandwidth IoT data) to be transmitted via the broadband communication link 112 and other categories of IoT data (e.g., low bandwidth IoT data) to be transmitted via the narrowband communication link 114. In these embodiments, the IoT device 120 transmits the IoT data to the analytics servers 130 via the broadband communication link 112 when the IoT data relates to categories of IoT data to be transmitted via the broadband communication link 112. On the other hand, when the IoT data relates to categories of IoT data to be transmitted via the narrowband communication link 114, then the IoT device 120 transmits the IoT data to the analytics servers 130 via the narrowband communication link 114. In accordance with embodiments, the rule engine 240 further includes a third transmission rule that defines a condition under which a particular IoT data (e.g., IoT data that, by default, should be transmitted through the broadband communication link 112) should be transmitted via the narrowband communication link 114 in case of a failure in the broadband communication link 112. In these embodiments, the third transmission rule requires that a particular IoT data should be transmitted via the narrowband communication link 114 (in case of failure in the broadband communication link 112) only when an aggregated data ranking assigned to any IoT data captured prior to the particular IoT data but matching with the particular IoT data is above a predefined threshold.

In the example shown in FIG. 4, when the IoT device 120 captures water level measurement of '30' units (i.e., corresponding to IoT data identifier 'D2') at time 'T2', in accordance with the transmission rules defined in the rule engine 240, the IoT device 120 first determines whether there is a change of state with respect to the water level measurement of '30' units captured at time 'T2'. Since there is a change of state in the IoT data based on the differences in the water levels measured at times 'T1' (i.e., '5' units) and 'T2' (i.e., '30' units), the IoT device 120 further determines whether the IoT data representing the water level measurement corresponds to a category of IoT data to be transmitted via the broadband communication link 112. If the IoT device 120 determines that the IoT data representing the water level measurement corresponds to a category of IoT data to be transmitted via the broadband communication link 112, then the IoT device 120 transmits the IoT data representing the water level measurement of '30' units captured at time 'T2' via the broadband communication link 112 unless there is a failure in the broadband communication link 112. On the other hand, if the IoT device 120 determines that the IoT data representing the water level measurement corresponds to a category of IoT data to be transmitted via the narrowband communication link 114, then the IoT device 120 transmits the IoT data representing the water level measurement of '30' units captured at time 'T2' via the narrowband communication link 114.

At block 820, the IoT device 120 receives acknowledgments including data rankings from the analytics servers 130. In accordance with some embodiments, the IoT device 120 may receive the acknowledgments from the analytics servers 130 via the IoT gateway 110. In another embodiment, the IoT device 120 may be configured to directly receive (i.e., without the IoT gateway 110 acting as an interface between the IoT device 120 and the analytics servers 130) the acknowledgments from the analytics servers 130. In any case, the acknowledgment received from each analytics server 130 includes a respective one of the data rankings indicating an importance of the IoT data as an input to the IoT analytics service provided by the respective analytics server 130. The acknowledgment received from each analytics server 130 may include, in addition to a data ranking (e.g., a value indicating the importance of the particular IoT data), one or more of: a service identifier uniquely identifying the analytics service provided by the analytics server 130, a message identifier uniquely identifying the message in response to which the acknowledgement is being transmitted, and an IoT data identifier uniquely identifying one or more data values representing the IoT data. In accordance with embodiments, each analytics server 130 may compute a data ranking to be assigned to a particular IoT data based on the level of importance of one or more data values as an input for providing a respective analytics service. As an example, an analytics server 130-2 providing insights on pump maintenance may weigh certain measurements (e.g., temperature, noise level, lubricant level, vibration level) with critical data values (e.g., data values beyond a certain threshold) as a critical input for providing its analytics service and therefore may assign a higher rank for data values representing such measurements.

In accordance with some embodiments, the IoT device 120 maintains IoT data ranking information (similar to IoT data ranking information 530 shown in FIG. 6) to track the rankings respectively included in the acknowledgments received from the analytics servers 130 for a particular IoT data reported to the analytics servers 130. Briefly referring to the example shown in FIG. 6, suppose the IoT data 610 captured by the IoT device 120 indicates a water level of '30' units during a 'Rainy' weather and the IoT device 120 has reported the IoT data 610 to the analytics servers 130-1, 130-2, and 130-3. In this example, the analytics server 130-1 that provides a first analytic service offering insights on water distribution optimization may determine that IoT data 610 indicating a water level of '30' units during a 'Rainy' weather is an important input for providing the first analytics service and accordingly may assign a highest score of '100' to the IoT data 610. Accordingly, the analytics server 130-1 transmits an acknowledgment including a ranking of '100' to the IoT device 120. The analytics server 130-2 that provides a second analytic service offering insights on pump maintenance may determine that the IoT data 610 indicating a water level of '30' units during a 'Rainy' weather is not a critical input (for example, when compared to measurements such as pump temperature, noise level etc.) for providing the second analytics service and accordingly may assign a lower score of '15' to the IoT data 610. Accordingly, the analytics server 130-2 transmits an acknowledgment including a ranking of '15' to the IoT device 120. The IoT device 120 may further receive an acknowledgment including a ranking of '50' from the analytics server 130-3 that provides a third analytics service offering insight on water usage.

Next, at block 830, the IoT device 120 assigns an aggregated data ranking for the particular IoT data based on the data rankings included in the acknowledgments received from the analytics servers 130. In accordance with some embodiments, the IoT device 120 determines an aggregated data ranking by computing an average of the data rankings included in the acknowledgments received from the IoT analytics servers 130. FIG. 6 provides an example of aggregated data ranking assigned to different IoT data. For example, the IoT data indicating a water level measurement of '5' units during 'Sunny' weather is assigned an aggregated data ranking of '30' by averaging the data rankings '40', '15', '15' received from the analytics servers 130-1, 130-2, and 130-3, respectively. The IoT data indicating a water level measurement of '30' units during 'Rainy' weather is assigned an aggregated data ranking of '55' by averaging the data rankings '100', '15', and '50' received from the analytics servers 130-1, 130-2, and 130-3, respectively. The IoT data indicating a water level measurement of '50' units during 'Sunny' weather is assigned an aggregated data ranking of '35' by averaging the data rankings '50', '15', '40' received from the analytics servers 130-1, 130-2, and 130-3, respectively. In other embodiments, the IoT device 120 may aggregate the data rankings received from analytics servers using mathematical functions other than an average function.

In accordance with embodiments, the IoT device 120 may update the IoT data transmission status information 235 (see FIG. 4) to track the aggregated data rankings assigned to IoT data captured at different points in time. In the example shown in FIG. 4, the IoT device 120 assigns an aggregated data ranking of '30' with respect to IoT data 'D2' (i.e., with IoT data representing water level measurement of '30' units) captured at time 'T1' and transmitted to the analytics servers 130. Since the IoT device 120 has captured the same data value (i.e., water level measurement of '30' units) again at time 'T5', the stored data ranking 440 corresponding to IoT data 'D2' captured at time 'T5' is updated with the aggregated data ranking 470 previously assigned to IoT data 'D2' captured at 'T2'. In accordance with embodiments, the IoT device 120 will use the stored data ranking 440 to determine whether to transmit the IoT data via the narrowband communication link 114 in case of a failure in the broadband communication link 112.

Returning to FIG. 8, at block 840, the IoT device 120 captures new IoT data. As used herein, the term "new IoT data" represents IoT data most recently captured by the IoT device 120. As an example, referring to FIG. 4, the most recently captured IoT data or the "new IoT data" at time 'T2' is the water level measurement of '30' units corresponding to IoT data identifier 'D2'. Similarly, the most recently captured IoT data or the "new IoT data" at time 'T3' is the water level measurement of '25' units corresponding to IoT data identifier 'D3'. In accordance with embodiments, the IoT device 120 determines whether to report the new IoT data to the analytics servers 130 in accordance with the transmission rules specified in the rule engine 240. In accordance with some embodiments, the IoT device 120 first determines, in accordance with the first transmission rule defined in the rule engine 240, whether the new IoT data represents a change of state relative to an immediately preceding IoT data captured by the IoT device 120. In these embodiments, the IoT device 120 determines to report the new IoT data to the analytics servers 130 only when the new IoT data represents a change of state relative to the immediately preceding IoT data captured by the IoT device 120.

At block 850, the IoT device 120 further determines, in accordance with the second transmission rule defined in the rule engine 240, that the new IoT data should be reported via a broadband communication link 112. In accordance with some embodiments, the second transmission rule defined in the rule engine 240 may require certain categories of IoT data to be transmitted via the broadband communication link 112. In these embodiments, if the new IoT data is associated with one of the defined categories of IoT data to be transmitted via the broadband communication link 112, then the IoT device 120 determines that the new IoT data should be reported via the broadband communication link 112 as shown in block 850.

Next, the IoT device 120 detects whether there is a failure in the broadband communication link 112. If the IoT device 120 detects that the broadband communication link 112 is working, then the IoT device 120 reports the new IoT data by transmitting the new IoT data to the analytics servers 130 via the broadband communication link 112. On the other hand, as shown in block 860, if the IoT device 120 detects that there is a failure in the broadband communication link 112, then the IoT device 120 further determines that, in accordance with the third transmission rule defined in the rule engine 240, in case of a failure of the broadband communication link 112, the new IoT data should be reported via a narrowband communication link 114 only when an aggregated data ranking assigned to any IoT data captured prior to the new IoT data but matching with the new IoT data is above a predefined threshold.

At block 870, when the IoT device 120 determines that the new IoT data matches with a previously captured IoT data (e.g., IoT data transmitted to analytics servers 130 at block 810) and further the aggregated data ranking assigned corresponding to the previously captured IoT data is above the predefined threshold, the IoT device 120 transmits the new IoT data via the narrowband communication link 114.

For example, referring to FIG. 4, assume the IoT device 120 has recently captured new IoT data 'D2' at time 'T5' representing water level measurement of '30' units. In this case, the IoT device 120 first determines, in accordance with the first transmission rule defined in the rule engine 240, whether the new IoT data 'D2' indicates a change of state. Since the new IoT data 'D2' captured at time 'T5' has a value of '30' units that is different from a data value of '25' units associated with an immediately preceding IoT data 'D3' captured at time 'T4', the IoT device 120 determines that the new IoT data 'D2' should be reported to the analytics servers 130. The IoT device 120 next determines, in accordance with the second transmission rule defined in the rule engine 240, that the new IoT data 'D2' representing water level measurement of '30' units is associated with categories of IoT data to be reported via the broadband communication link 112 unless there is a failure in the broadband communication link 112. In this example, since there is a failure in the broadband communication link 112 (as indicated in the broadband connection status 450 corresponding to the new IoT data 'D2'), the IoT device 120 further determines, in accordance with the third transmission rule defined in the rule engine 240, that IoT data 'D2' previously captured at time 'T2' has a matching data value i.e., water level measurement of '30' units. Accordingly, the IoT device 120 uses the aggregated data ranking assigned to the previously captured IoT data 'D2' (i.e., captured at time 'T2') to determine whether the new IoT data 'D2' captured at time 'T5' can be transmitted via the narrowband communication link 114. Since the aggregated data ranking '55' assigned to the previously captured IoT data 'D2' is more than a predefined threshold of '50', the IoT device 120 transmits the new IoT data 'D2' captured at time 'T5' via the narrowband communication link 114. The IoT device 120 also updates the transmission status 460 shown in FIG. 4 to indicate that the new IoT data 'D2' captured at time 'T5' has been transmitted via the narrowband communication link 114.

As another example, referring to FIG. 4, assume the IoT device 120 has recently captured new IoT data 'D3' at time 'T7' representing water level measurement of '25' units. In this case, the IoT device 120 first determines, in accordance with the first transmission rule defined in the rule engine 240, whether the new IoT data 'D3' indicates a change of state. Since the new IoT data 'D3' captured at time 'T7' has a data value of '25' units that is different from a data value of '5' units (i.e., representing water level) associated with an immediately preceding IoT data 'D1' captured at time 'T6', the IoT device 120 determines that the new IoT data 'D3' should be reported to the analytics servers 130. The IoT device 120 next determines, in accordance with the second transmission rule defined in the rule engine 240, that the new IoT data 'D3' representing water level measurement of '25' units is associated with categories of IoT data to be reported via the broadband communication link 112 unless there is a failure in the broadband communication link 112. In this example, since there is a failure in the broadband communication link 112 (as indicated in the broadband connection status 450 corresponding to new IoT data 'D3'), the IoT device 120 further determines, in accordance with the third transmission rule defined in the rule engine 240, that IoT data 'D3' previously captured at time 'T3' (as well as IoT data 'D3' captured at time 'T4') has a matching data value i.e., water level measurement of '25' units. Accordingly, the IoT device 120 uses the aggregated data ranking assigned to the previously captured IoT data 'D3' (i.e., captured at time 'T3') to determine whether the new IoT data 'D3' captured at time 'T7' can be transmitted via the narrowband communication link 114. Since the aggregated data ranking '35' assigned to IoT data 'D3' is not greater than a predefined threshold of '50', the IoT device 120 refrains from reporting the new IoT data 'D3' captured at time 'T7' and therefore does not transmit the new IoT data via the narrowband communication link 114. The IoT device 120 also updates the transmission status 460 shown in FIG. 4 to indicate that the new IoT data 'D3' captured at time 'T7' has not been transmitted via the narrowband communication link 114.

Accordingly, embodiments described herein can be advantageously implemented to prioritize transmission of particular IoT data via a narrowband communication link in case of a failure in the broadband communication link based on feedback received from analytics servers indicating importance of particular IoT data as inputs to the IoT analytics services respectively provided by different analytics servers.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of ranking internet-of-things (IoT) data based on IoT analytics services, the method comprising:
   receiving, at an IoT gateway, a particular IoT data captured by an IoT device;
   transmitting, at the IoT gateway, the particular IoT data to a plurality of IoT analytics servers each providing a different IoT analytics service;
   receiving, at the IoT gateway, acknowledgments including data rankings assigned to the particular IoT data from the plurality of IoT analytics servers, each of the acknowledgments including a respective one of the data rankings indicating an importance of the particular IoT data as an input to the IoT analytics service provided by a respective one of the IoT analytics servers;
   assigning, at the IoT gateway, an aggregated data ranking to the particular IoT data based on the data rankings included in the acknowledgments received from the IoT analytics servers; and
   transmitting, at the IoT gateway, to the IoT device, an electronic notification including the aggregated data ranking assigned to the particular IoT data.

2. The method of claim 1, wherein the particular IoT data includes one or more data values measured by the IoT device corresponding to a state of an object monitored by the IoT device or an environment within which the object is located.

3. The method of claim 1, wherein assigning an aggregated data ranking comprises:
   determining the aggregated data ranking by computing an average of the data rankings included in the acknowledgments received from the IoT analytics servers.

4. The method of claim 1, further comprising:
   receiving, at the IoT device, the electronic notification including the aggregated data ranking assigned to the particular IoT data; and
   storing, at the IoT device, the aggregated data ranking assigned to the particular IoT data.

5. The method of claim 1, further comprising:
   capturing, at the IoT device, new IoT data; and
   determining, at the IoT device, whether the new IoT data represents a change of state relative to an immediately preceding IoT data captured by the IoT device.

6. The method of claim 5, further comprising:
   determining, at the IoT device, not to report the new IoT data to the analytics servers when the new IoT data does not represent a change of state relative to the immediately preceding IoT data captured by the IoT device.

7. The method of claim 5, further comprising:
   determining, at the IoT device, to report the new IoT data to the analytics servers when the new IoT data represents a change of state relative to the immediately preceding IoT data captured by the IoT device.

8. The method of claim 7, wherein after determining to report the new IoT data, the method further comprising:
   determining, at the IoT device, from a rule engine maintained at the IoT device, that the new IoT data should be reported via a broadband communication link but in case of a failure of the broadband communication link, the new IoT data should be reported via a narrowband communication link only when an aggregated data ranking assigned to any IoT data captured prior to the new IoT data but matching with the new IoT data is above a predefined threshold.

9. The method of claim 8, further comprising:
   detecting there is no failure in the broadband communication link; and
   reporting the new IoT data to the analytics servers by transmitting the new IoT data to the IoT gateway via the broadband communication link.

10. The method of claim 8, further comprising:
    detecting a failure in the broadband communication link;
    determining that the new IoT data matches with the particular IoT data previously transmitted to the IoT gateway and further the aggregated data ranking assigned corresponding to the particular IoT data is above the predefined threshold; and
    reporting the new IoT data to the analytics servers by transmitting the new IoT data to the IoT gateway via the narrowband communication link.

11. The method of claim 8, further comprising:
    detecting a failure in the broadband communication link;
    determining that the new IoT data matches with the particular IoT data transmitted to the IoT gateway but the aggregated data ranking assigned corresponding to the particular IoT data is not above the predefined threshold; and
    refraining from reporting the new IoT data to the analytics servers.

12. The method of claim 1, wherein the aggregated data ranking assigned to the particular IoT data is different from an aggregated data ranking assigned to a different IoT data captured by the IoT device.

13. A method of ranking internet-of-things (IoT) data based on IoT analytics services, the method comprising:
    transmitting, at an IoT device, a particular IoT data captured by the IoT device to a plurality of IoT analytics servers each providing a different IoT analytics service;
    receiving, at the IoT device, acknowledgments including data rankings assigned to the particular IoT data from the plurality of IoT analytics servers, each of the acknowledgments including a respective one of the data rankings indicating an importance of the particular IoT data as an input to the IoT analytics service provided by a respective one of the IoT analytics servers;

assigning, at the IoT device, an aggregated data ranking for the particular IoT data based on the data rankings including in the acknowledgments received from the IoT analytics servers; and storing, at the IoT device, the aggregated data ranking assigned to the particular IoT data.

14. The method of claim 13, wherein the particular IoT data includes one or more data values measured by the IoT device corresponding to a state of an object monitored by the IoT device or an environment within which the object is located.

15. The method of claim 13, wherein the particular IoT data includes a vectorized dataset of multiple interrelated data values each measured corresponding to a state of a respective one of multiple objects monitored by the IoT device or an environment within which the respective one of multiple objects monitored by the IoT device is located.

16. The method of claim 15, wherein the aggregated data ranking is assigned corresponding to the vectorized dataset of multiple interrelated data values.

17. The method of claim 13, further comprising:

capturing, at the IoT device, new IoT data; and determining, at the IoT device, from a rule engine maintained at the IoT device, that the new IoT data should be reported via a broadband communication link but in case of a failure of the broadband communication link, the new IoT data should be reported via a narrowband communication link only when an aggregated data ranking assigned to any IoT data captured prior to the new IoT data but matching with the new IoT data is above a predefined threshold.

18. The method of claim 17, further comprising:

detecting there is no failure in the broadband communication link; and reporting the new IoT data by transmitting the new IoT data to the plurality of IoT analytics servers via the broadband communication link.

19. The method of claim 17, further comprising:

detecting a failure in the broadband communication link;

determining that the new IoT data matches with the particular IoT data previously transmitted to the analytics servers and further the aggregated data ranking assigned corresponding to the particular IoT data is above the predefined threshold; and reporting the new IoT data to the analytics servers by transmitting the new IoT data to the analytics servers via the narrowband communication link.

20. The method of claim 17, further comprising:

detecting a failure in the broadband communication link;

determining that the new IoT data matches with the particular IoT data previously transmitted to the analytics servers;

determining the aggregated data ranking assigned corresponding to the particular IoT data is not above the predefined threshold; and refraining from reporting the new IoT data to the analytics servers.

21. A IoT gateway, comprising:

a communication interface; and an electronic processor communicatively coupled to the electronic processor, the electronic processor configured to:

receive, via the communication interface, a particular IoT data captured by an IoT device;

transmit, via the communication interface, the particular IoT data to a plurality of IoT analytics servers each providing a different IoT analytics service;

receive, via the communication interface, acknowledgments including data rankings assigned to the particular IoT data from the plurality of IoT analytics servers, each of the acknowledgments including a respective one of the data rankings indicating an importance of the particular IoT data as an input to the IoT analytics service provided by a respective one of the IoT analytics servers;

assign an aggregated data ranking for the particular IoT data based on the data rankings included in the acknowledgments received from the IoT analytics servers; and transmit, via the communication interface, to the IoT device, an electronic notification including the aggregated data ranking assigned to the particular IoT data.

* * * * *